(12) United States Patent
Hoffman et al.

(10) Patent No.: US 8,472,046 B2
(45) Date of Patent: Jun. 25, 2013

(54) PRINTER SYSTEMS AND METHODS FOR GLOBAL TRACKING OF PRODUCTS IN SUPPLY CHAINS, AUTHENTICATION OF PRODUCTS, AND CONNECTING WITH CUSTOMERS BOTH BEFORE, DURING, AND AFTER A PRODUCT SALE

(75) Inventors: George K. Hoffman, Kernersville, NC (US); Sheila A. Babine, Arlington, MA (US); Joseph E. Ford, Woburn, MA (US)

(73) Assignee: Avery Dennison Corporation, Pasadena, CA (US)

( * ) Notice: Subject to any disclaimer, the term of this patent is extended or adjusted under 35 U.S.C. 154(b) by 1239 days.

(21) Appl. No.: 12/243,053

(22) Filed: Oct. 1, 2008

(65) Prior Publication Data

US 2009/0021788 A1    Jan. 22, 2009

Related U.S. Application Data

(63) Continuation-in-part of application No. 11/376,639, filed on Mar. 10, 2006, now Pat. No. 7,654,464.

(60) Provisional application No. 60/661,105, filed on Mar. 11, 2005.

(51) Int. Cl.
    *G06K 15/00* (2006.01)
    *G06K 9/00* (2006.01)
    *G06F 3/12* (2006.01)
    *H04N 1/40* (2006.01)

(52) U.S. Cl.
    USPC .......... 358/1.15; 358/470; 358/3.31; 382/187

(58) Field of Classification Search
    USPC ...... 358/1.16, 1.15, 3.31, 470; 705/50; 707/6; 709/201; 382/187; 235/462.01
    See application file for complete search history.

(56) References Cited

U.S. PATENT DOCUMENTS

| 5,315,508 A | 5/1994 | Bain et al. |
| 5,869,819 A * | 2/1999 | Knowles et al. ............. 235/375 |
| 6,107,920 A | 8/2000 | Eberhardt et al. |

(Continued)

FOREIGN PATENT DOCUMENTS

| WO | 03003270 | 1/2003 |
| WO | 2006099123 | 9/2006 |

OTHER PUBLICATIONS

International Search Report and Written Opinion dated Jun. 19, 2008 relating to PCT/US06/08573.

*Primary Examiner* — Jerome Grant, II
(74) *Attorney, Agent, or Firm* — Avery Dennison Corporation

(57) ABSTRACT

Printer systems and methods provide a plurality of unique identification codes to assignment devices in various geographical locations in order to assign a unique code to a single item of commerce through affixing tags or the like thereon or by direct printing. Information regarding which code is associated with which item of commerce may be captured and stored in database(s) along with other advertising, authenticity, distribution, manufacturing, note, quality control, and retail information. Inquires may be made regarding the codes by users with handheld devices including cellular phones, PDAs, notebook computers, barcode scanners, RFID readers, etc. through carrier networks, LANs, and WANs in order to obtain information about the item of commerce or related products. Stored information from the database may be provided to the users in response to their inquiries. Information may also be uploaded by the handheld devices for counterfeiting, diversion, and other tracking purposes.

34 Claims, 6 Drawing Sheets

U.S. PATENT DOCUMENTS

| | | |
|---|---|---|
| 6,206,292 B1 | 3/2001 | Robertz et al. |
| 6,327,972 B2 | 12/2001 | Heredia et al. |
| 6,993,573 B2 | 1/2006 | Hunter |
| 7,207,481 B2 | 4/2007 | Barenburg et al. |
| 7,261,235 B2 | 8/2007 | Barenburg et al. |
| 7,262,685 B2 | 8/2007 | Bastian, II |
| 7,337,968 B2 * | 3/2008 | Wilz et al. ............... 235/462.01 |
| 7,347,373 B2 | 3/2008 | Singh |
| 7,410,099 B2 | 8/2008 | Fukasawa et al. |
| 2001/0042009 A1 | 11/2001 | Montague |
| 2002/0023949 A1 | 2/2002 | Tucker et al. |
| 2002/0030854 A1 | 3/2002 | Schutz et al. |
| 2002/0038267 A1 | 3/2002 | Can et al. |
| 2002/0099683 A1 | 7/2002 | Sloan et al. |
| 2002/0133434 A1 * | 9/2002 | Nevel et al. ............... 705/28 |
| 2003/0004946 A1 | 1/2003 | VanDenAvond et al. |
| 2003/0061217 A1 | 3/2003 | Whittingham et al. |
| 2003/0076538 A1 | 4/2003 | Whittingham et al. |
| 2003/0098350 A1 | 5/2003 | Liou et al. |
| 2003/0132854 A1 | 7/2003 | Swan et al. |
| 2003/0150911 A1 | 8/2003 | Joseph |
| 2003/0169149 A1 | 9/2003 | Ohki et al. |
| 2004/0111277 A1 | 6/2004 | Pearson et al. |
| 2004/0195321 A1 | 10/2004 | Silverbrook et al. |
| 2004/0195342 A1 | 10/2004 | Silverbrook et al. |
| 2004/0210319 A1 | 10/2004 | Lapstun et al. |
| 2004/0254842 A1 | 12/2004 | Kirkegaard |
| 2005/0036651 A1 | 2/2005 | Wen |
| 2005/0091821 A1 | 5/2005 | Best et al. |
| 2005/0183990 A1 | 8/2005 | Corbett, Jr. |
| 2005/0236483 A1 * | 10/2005 | Wilz et al. ............... 235/462.01 |
| 2006/0010042 A1 | 1/2006 | Gianakis et al. |
| 2006/0180647 A1 | 8/2006 | Hansen |
| 2006/0220865 A1 | 10/2006 | Babine et al. |
| 2006/0252489 A1 | 11/2006 | Walker et al. |
| 2006/0288072 A1 | 12/2006 | Knapp et al. |
| 2007/0100707 A1 | 5/2007 | Driessen et al. |
| 2007/0118388 A1 | 5/2007 | Hamilton et al. |
| 2007/0131774 A1 | 6/2007 | Celestini |
| 2007/0192123 A1 | 8/2007 | Sagan et al. |
| 2007/0198357 A1 | 8/2007 | Ravazzolo |
| 2007/0210164 A1 | 9/2007 | Conlon et al. |
| 2007/0222596 A1 | 9/2007 | Kleijn et al. |
| 2008/0058985 A1 | 3/2008 | Alcov |
| 2008/0093460 A1 | 4/2008 | Frantz et al. |
| 2008/0106726 A1 | 5/2008 | Park |
| 2008/0191842 A1 | 8/2008 | Spenik et al. |
| 2009/0076960 A2 * | 3/2009 | Hamel et al. ............... 705/50 |
| 2009/0291668 A1 * | 11/2009 | Huang et al. ............... 455/410 |
| 2010/0052862 A1 * | 3/2010 | Hsieh et al. ............... 340/10.2 |

* cited by examiner

PRINTER SYSTEMS AND METHODS FOR GLOBAL TRACKING OF PRODUCTS IN SUPPLY CHAINS, AUTHENTICATION OF PRODUCTS, AND CONNECTING WITH CUSTOMERS BOTH BEFORE, DURING, AND AFTER A PRODUCT SALE

CROSS-REFERENCE TO RELATED APPLICATIONS

The present application claims the benefit under 35 U.S.C. §§119, 120 of U.S. provisional Patent Application Ser. No. 60/661,105, filed Mar. 11, 2005 and U.S. non-provisional patent application Ser. No. 11/376,639, filed Mar. 10, 2006, the disclosures of which are incorporated herein in their entirety by reference.

BACKGROUND

Currently, supply chain management is a cross-functional approach to manage the movement of raw materials into an organization, the internal processing of materials into finished goods, and the movement of finished goods out of the organization toward the end-consumer. As organizations strive to focus on core competencies and become more flexible, they have reduced their ownership of raw materials sources and distribution channels. Increasingly, these functions are being outsourced to other entities that can perform the activities better or more cost effectively. The effect is to increase the number of organizations involved in satisfying customer demand, while reducing management control of daily logistics operations. The purpose of supply chain management is to improve trust and collaboration among supply chain partners, thus improving inventory visibility and improving inventory velocity. However, traditional systems and methods of managing supply chains are inherently complex and problematic.

For example, with global trade, sellers are having products manufactured all over the world. One month products may be manufactured in a first country because of the supply and availability of certain raw materials or critical components. The next month those same products may be manufactured in a different facility in a different country because of, for example, changes in tariffs, regional conflicts, custom problems, transportation costs to move products from a manufacturer to a remote retailer, raw material shortages, quality control issues identified for a given manufacturing location, labor strikes, labor costs, etc.

Additional problems are created when individuals or entities attempt to counterfeit the goods and pass them off as authentic products in the stream of commerce. Consumers may not know whether a product is authentic or counterfeit. Consumers who accidentally purchase counterfeit goods may become upset after learning that the item is counterfeit, defective, or inferior in quality to the authentic products. Counterfeit goods may also cause consumer harm in situations such as, for example, lead paint on infant goods or ineffective pharmaceutical products. When attempting to return the counterfeit item to the manufacturer, the consumer may become frustrated if the manufacturer will not accept the return. Alternatively, if the consumer believes that that counterfeit product was authentic, the consumer may incorrectly assume that the manufacturer's quality is poor and its reputation may suffer.

Still other problems may be caused by globalization and complex supply chains. One such problem is product diversion. Often diversion is a civil contractual problem in the United States resulting from a sale outside the authorized store or class of trade for which the authentic products were intended. For instance, if a manufacturer sells authentic product to a high-end retail store, a contractual clause may prevent the retailer from diverting any excess authentic product to a low-end discount store. Oftentimes, these types of provisions are intended to protect brand or trade name reputation, which could be tarnished if the authentic products were sold in a low-end discount store. Nonetheless, if diverted product is found in a low-end discount store, it may be difficult to identify the high-end retailer from whom the authentic product was off loaded or diverted.

Yet other problems may arise even when a customer purchased authentic product and is pleased with it. For example, a customer may purchase high-quality apparel. After years of successful and pleasant use of the product, it may become damaged or worn out. The customer may then wish to purchase the same product again as a replacement. However, retailer or distributor information may not be present on the product or easily accessible. Consequently, the customer may be unable to determine from where replacement product of like or similar kind may be purchased. Similarly, the customer may not know whether associated products complementing the high quality apparel exist and, if so, from where they may be procured. Furthermore, manufacturers often have no way of knowing who the customers are who purchased the authentic products, let alone those customers who purchased the products and are pleased with them. Consequently, there is often a disconnect between manufacturers, retailers, and/or customers in view of globalization.

SUMMARY

The following presents a simplified summary in order to provide a basic understanding of various aspects and embodiments of the invention. The summary is not an extensive overview of the invention. It is neither intended to identify key or critical elements of the invention nor to delineate the scope of the invention. The following summary merely presents some concepts and sample embodiments of the invention in a simplified form as a prelude to the description provided herein.

In one embodiment, a plurality of unique identification codes may be provided. Preferably, only one code is assigned to any given item of commerce such as, for example, apparel, other softgoods, packaging, containers, devices, etc. A plurality of assignment devices (e.g. printers, etc.) may assign the codes to a plurality of items of commerce through direct printing or direct writing. Alternatively, a plurality of assignment devices (e.g., printers, etc.) to assign the codes to a plurality of items of commerce through printing to or writing the codes on tag-like items such as, for example, tags, labels, tickets, stickers, hang tags, price tickets, woven labels, heat transfer labels, woven neck labels, care labels, and security labels. Any number of assignment devices (e.g. printers, etc.) may be used. The assignment devices may be located at the same location or at any number of different geographical locations. Each unique identification code corresponds to only one item of commerce.

In another embodiment, one or more servers assign and keep track of the unique identification codes. The server(s) may store the codes on computer-readable media in one or more databases, data stores, separate files, or as metadata.

In a further embodiment, one or more servers communicate with the printers through a wide area network (WAN) such as, for example, the Internet. A cellular carrier network may also be used in addition to the WAN or instead of it. The printers may utilize network interface cards and local routers or switching equipment such that they may be in direct communication with the servers. Alternatively, one or more computers local to the printers and connected to them through a local area network (LAN) may function as intermediaries.

In still another embodiment, information may be provided from the printers or computers local thereto back to the server(s). The information may identify which unique identification code was associated with which item of commerce.

In yet another embodiment, additional information for a unique identification code or the tag-like item to which it was assigned may include: authenticity information, checkpoint information, contract number, country of origin, creation date, customs information, consumer identification information, drawings, EPC number, geographical location, invoice number, item size, item type, location in supply chain, manufacturing date, manufacturing location, notes, photographs, purchase order number, quality control information, retailer information, SKU number, videos, or any other type of information or metadata relating to the particular identification code, tag-like item, or item of commerce.

In various embodiments, the unique identification codes may be human readable, machine readable, or both. Any type of unique identification code may be used so long as each code is truly unique and is only associated with a single item of commerce. An example of unique identification code is an electronic product code (EPC).

In various embodiments, the assignment devices may be radio frequency identification printers, radio frequency identification readers/encoders, bar code printers, digital presses, laser printers, thermal printers, inkjet printers, and/or any combination thereof.

In a further embodiment, one or more servers may receive inquiries, such as an inquiry about a specific unique identification code or the item of commerce to which it was assigned. A server may then use the inquiry to reference in the database, data store, file, or metadata information relating to the item of commerce. In one embodiment, the inquiry and response thereto may be transmitted through a WAN. In another embodiment, the inquiry and response thereto may be transmitted through a carrier network (e.g., a network operated by a mobile network operator, a carriage service provider, a wireless service provider, wireless carrier, mobile phone operator, or cellular company) and then through the WAN.

In other embodiments, one or more handheld devices may be used to make inquiries regarding one or more unique identification codes or the items of commerce to which they correspond. Sample handheld devices include cellular phones, personal digital assistants, RFID readers, RFID readers/writers, barcode scanners, notebook computers, laptop computers, tablet pcs, or other handheld devices. The handheld devices may communicate with the server(s) through a WAN, carrier network, or both.

In various embodiments, the handheld devices may receive an identification of the unique identification code from the tag-like item for an item of commerce by reading a radio frequency identification, scanning a barcode, performing optical character recognition, allowing manual entry of the code through a keyboard, or by using any other reading or entry method.

In one embodiment, responses to inquiries may be provided directly by one or more servers. The responses may be pre-determined based on the desires of a manufacturer, distributor, retailer, or other authorized entity. Alternatively, the responses may be dynamic based on the nature of the inquiry and the contents of the database(s) for the item of commerce. Still another option is for the server(s) to relay inquiries to the manufacturer, distributor, retailer, or other authorized entity in order for them to provide a direct response to the person or entity making the inquiry.

In still a further embodiment, a customer or user may be allowed to register with the server(s). Information may be entered a single time in order to capture information supplied by the customer such as name, address, e-mail address, geographical location, gender, phone numbers, etc. By registering a single time, the server(s) may be able to automatically recognize the customer or user whenever an inquiry is made. This obviates the need for repetitive registrations or repetitive entry of information by the customers, thereby improving the user experience. Customers may be identified automatically by their phone number, IP address, login, etc. The server(s) may provide this information to manufacturers, distributors, retailers, or other authorized entities, if desired.

Additional features and advantages of the invention will be apparent upon reviewing the following detailed description.

BRIEF DESCRIPTION OF THE DRAWINGS

The present disclosure is illustrated by way of example and not limited in the accompanying figures in which like reference numerals indicate similar elements.

DETAILED DESCRIPTION

In accordance with various aspects of the disclosure, printer systems and methods are illustrated for facilitating global tracking of products in a supply chain; enabling authentication of products by manufacturers, inspectors, retailers, and customers; and helping manufacturers, distributors or retailers to connect with customers before a product sale, at the time of a product sale, and post-sale.

Figure 1:
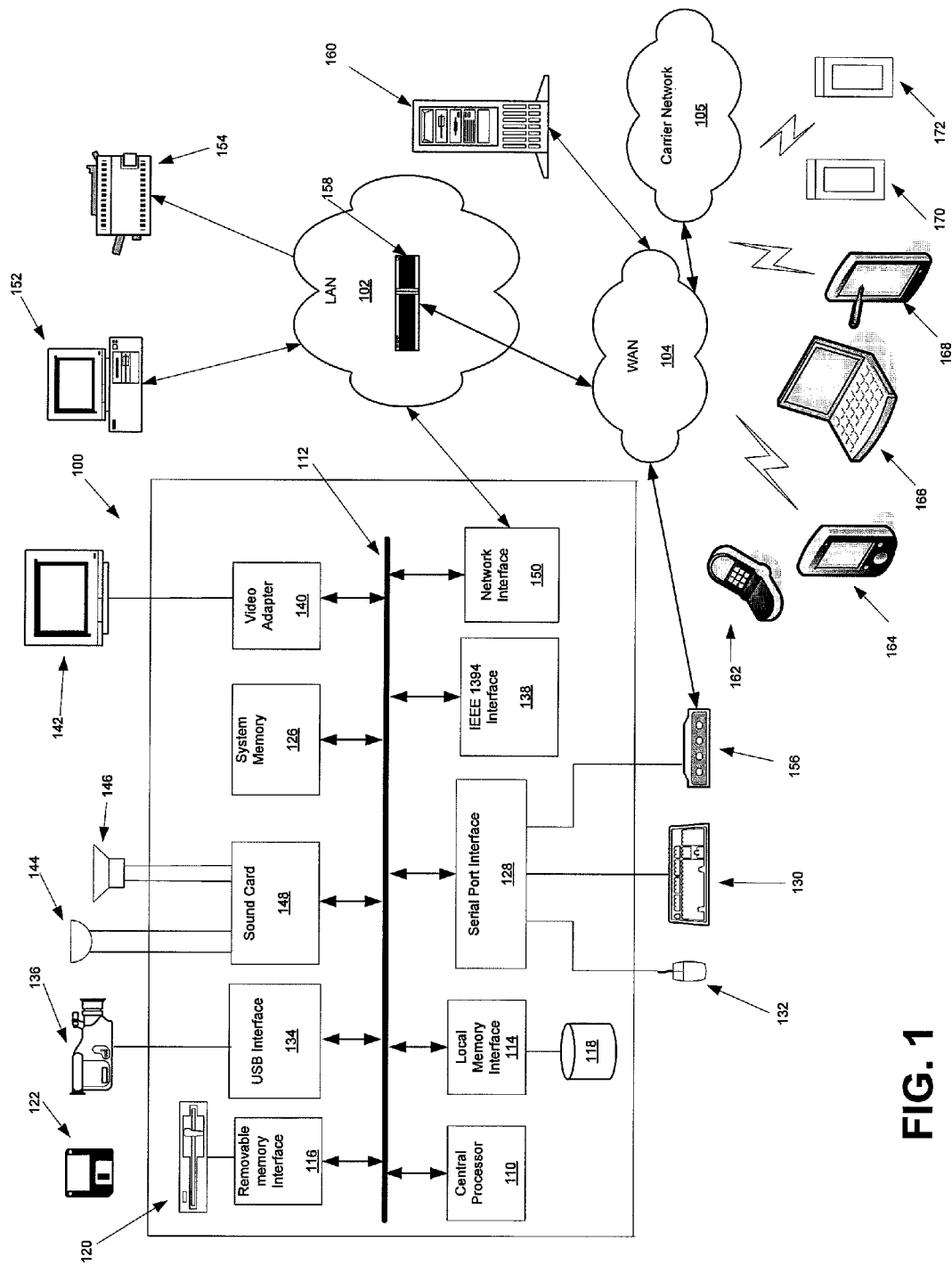
FIG. 1 illustrates an example of a suitable operating environment in which various aspects of the disclosure may be implemented.

Various aspects of the present invention are preferably implemented in conjunction with one or more computers, one or more handheld devices, one or more networks, and a plurality of assignment devices (e.g., printers, etc.). An exemplary operating environment for a typical computer that may be used in conjunction with the present invention is shown in FIG. 1 along with a server, various types of networks, and handheld devices. An overview of the relationship between the computers, handheld devices, networks, and assignment devices (e.g., printers, etc.) is provided in FIG. 2.

As shown in FIG. 1, a computer 100 is connected to a local area network (LAN) 102 and a wide area network (WAN) 104. Computer 100 includes a central processor 110 that controls the overall operation of the computer and a system bus 112 that connects central processor 110 to the components described below. System bus 112 may be implemented with any one of a variety of conventional bus architectures.

Computer 100 can include a variety of interface units and drives for reading and writing data or files. In particular, computer 100 includes a local memory interface 114 and a removable memory interface 116 respectively coupling a hard disk drive 118 and a removable memory drive 120 to system bus 112. Examples of removable memory drives include magnetic disk drives 122 and optical disk drives such as CDs, DVDs, HD-DVDs, Blu-Ray DVDs, and other optical media. Hard disks generally include one or more read/write heads that convert bits to magnetic pulses when writing to a computer-readable medium and magnetic pulses to bits when reading data from the computer readable medium. A single hard disk drive 118 and a single removable memory drive 120 are shown for illustration purposes only and with the understanding that computer 100 may include several of such drives. Furthermore, computer 100 may include drives for interfacing with other types of computer readable media such as magneto-optical drives.

Unlike hard disks, system memories, such as system memory 126, generally read and write data electronically and do not include read/write heads. System memory 126 may be implemented with a conventional system memory having a read only memory section that stores a basic input/output system (BIOS) and a random access memory (RAM) that stores other data and files.

A user can interact with computer 100 with a variety of input devices. FIG. 1 shows a serial port interface 128 coupling a keyboard 130 and a pointing device 132 to system bus 112. Pointing device 132 may be implemented with a hard-wired or wireless mouse, track ball, pen device, or similar device.

Computer 100 may include additional interfaces for connecting peripheral devices to system bus 112. FIG. 1 shows a universal serial bus (USB) interface 134 coupling a video or digital camera 136 to system bus 112. An IEEE 1394 interface 138 may be used to couple additional devices to computer 100. Furthermore, interface 138 may configured to operate with particular manufacture interfaces such as FireWire developed by Apple Computer and i.Link developed by Sony. Peripheral devices may include touch sensitive screens, scanners, assignment devices, printers, and other input and output devices and may be coupled to system bus 112 through parallel ports, game ports, PCI boards or any other interface used to couple peripheral devices to a computer.

Computer 100 also includes a video adapter 140 coupling a display device 142 to system bus 112. Display device 142 may include a cathode ray tube (CRT), liquid crystal display (LCD), field emission display (FED), plasma display or any other device that produces an image that is viewable by the user. Sound can be recorded and reproduced with a microphone 144 and a speaker 146. A sound card 148 may be used to couple microphone 144 and speaker 146 to system bus 112.

One skilled in the art will appreciate that the device connections shown in FIG. 1 are for illustration purposes only and that several of the peripheral devices could be coupled to system bus 112 via alternative interfaces. For example, video camera 136 could be connected to IEEE 1394 interface 138 and pointing device 132 could be connected to USB interface 134.

Computer 100 includes a network interface 150 that couples system bus 112 to LAN 102. LAN 102 may have one or more of the well-known LAN topologies and may use a variety of different protocols, such as any Ethernet standard like, for instance, IEEE 802.11a, 802.11b, 802.11g, and 802.11n. Computer 100 may communicate with other computers and devices connected to LAN 102, such as computer 152 and printer 154. Computers and other devices may be connected to LAN 102 via twisted pair wires, coaxial cable, fiber optics or other media. Alternatively, radio waves may be used to connect one or more computers or devices to LAN 102.

A wide area network 104, such as the Internet, can also be accessed by computer 100. FIG. 1 shows a modem unit 156 connected to serial port interface 128 and to WAN 104. Modem unit 156 may be located within or external to computer 100 and may be any type of conventional modem, such as a cable modem or a satellite modem. LAN 102 may also be used to connect to WAN 104. FIG. 1 shows a router 158 that may connect LAN 102 to WAN 104 in a conventional manner. A server 160 is shown connected to WAN 104. Of course, numerous additional servers, computers, handheld devices, RFID readers or RFID reader/writers 170, bar code scanners 172, notebook computers 166, tablet pcs 168, personal digital assistants 164, cellular telephones 162 and other devices may also be connected to LAN 102 or WAN 104 either directly or through a mobile or wireless carrier network 105. Similarly, any handheld device may have included therein or as an attached device or module: RFID reading or writing, bar code scanning, camera, video, keyboard, text messaging, and/or optical character recognition functionality.

The operation of computer 100 and server 160 can be controlled by computer-executable instructions stored on a computer-readable medium 300. For example, computer 100 may include computer-executable instructions for transmitting information to server 160, receiving information from server 160 and displaying the received information on display device 142. Furthermore, server 160 may include computer-executable instructions for transmitting hypertext markup language (HTML) or extensible markup language (XML) computer code to computer 100.

As noted above, the term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" 102, 104, 105 but also a "content network," which is comprised of the data—attributable to a single entity—which resides across all physical networks.

Figure 2:
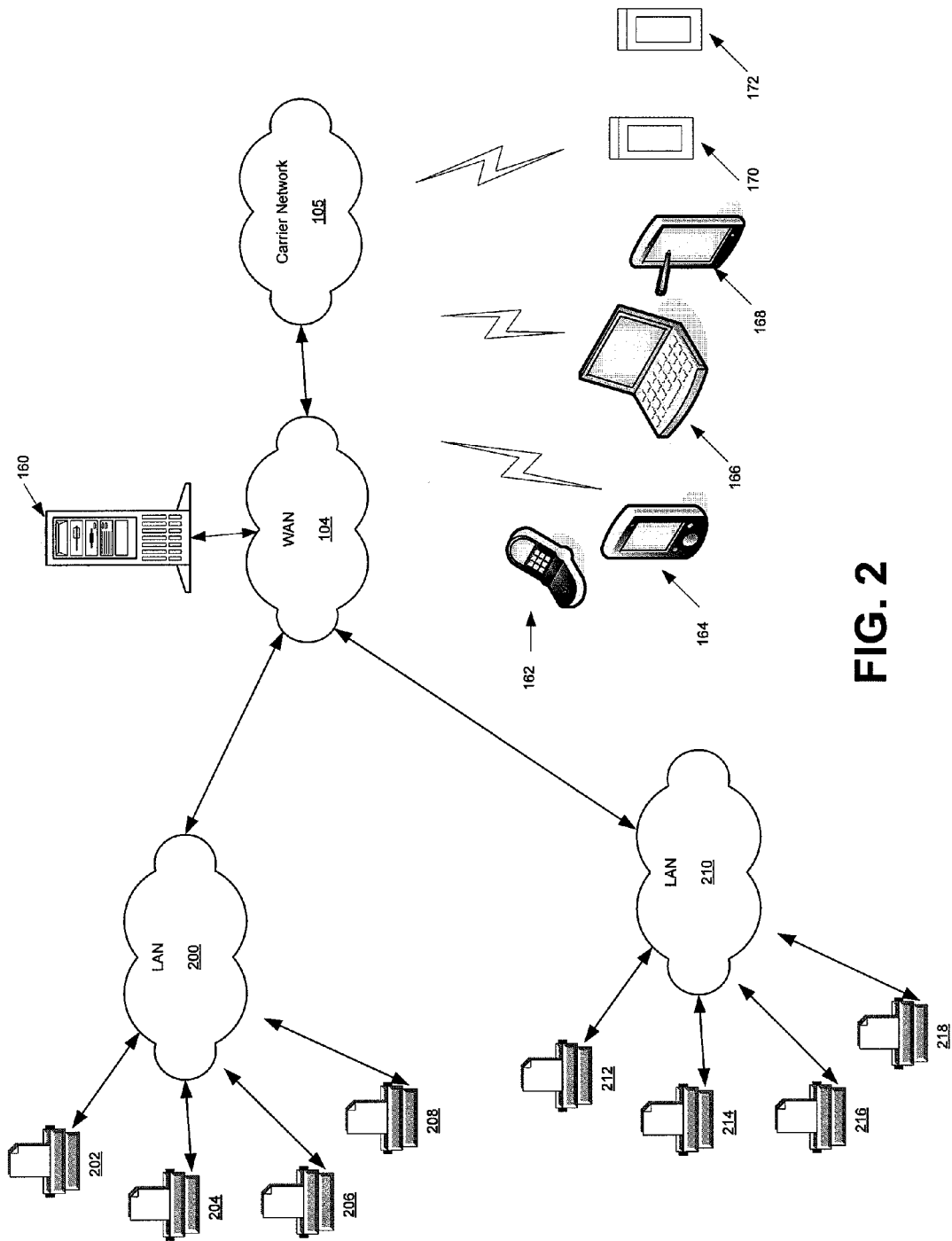
FIG. 2 depicts a sample LAN, WAN, and/or carrier network topology for printing or assigning unique identification codes to items of commerce in which various aspects of the disclosure may be implemented.

As shown in FIG. 2, any number of assignment devices (e.g., printers, etc.) 202-208 may be at a first location and may be coupled to WAN 104 either directly (not shown) or indirectly through LAN 200 or carrier network 105. The coupling may be hard wired or wireless. Similarly, any number of printers 212-218 may be in one or more other locations and may be coupled to WAN 104 either directly (not shown) or indirectly through LAN 210 or carrier network 105 (not shown).

The printers 202-208 and 212-218 may be radio frequency identification encoders/readers, radio frequency identification printers, bar code printers, digital presses, laser printers, thermal printers, inkjet printers, or any combination thereof.

In addition, printers 202-208 and 212-218 may have wired or wireless network interface cards and may also include a processor as well as internal memory.

If desired, LAN 200 and 210 may also include routers 158, switching equipment, and/or local computers such as personal computer 152. These items may be provided in order to facilitate communication with the WAN 104. Additionally or alternatively, these items may allow local control of the printers.

In some embodiments, the printers 202-208, 212-218 may be configured such that they are only allowed to print or write a unique identification code a single time. Alternatively, the server(s) 160 or local computer(s) 152 may allow the printers 202-208 and 212-218 to reprint or rewrite a tag-like item in the event of a printing or writing error.

Information pertaining to the unique identification code that is assigned to an item of commerce may be captured automatically by printers 202-208 and 212-218 through vision system or by using other automation equipment. Alternatively, information may be entered manually in local computer(s) 152. Examples of information that may be captured or entered include: the item of commerce to which the code was assigned, the tag-like item on which it was printed, authenticity information, checkpoint information, contract number, country of origin, creation date, customs information, consumer identification information, drawings, EPC number, geographical location, invoice number, item size, item type, location in supply chain, manufacturing date, manufacturing location, notes, photographs, purchase order number, quality control information, retailer information, SKU number, videos, or any other type of information or metadata relating to the particular identification code, tag-like item, or item of commerce. The information may then be communicated back to the server 160 through the WAN 104, carrier network 105, LAN 200 or 210, or any combination thereof.

Figure 3:
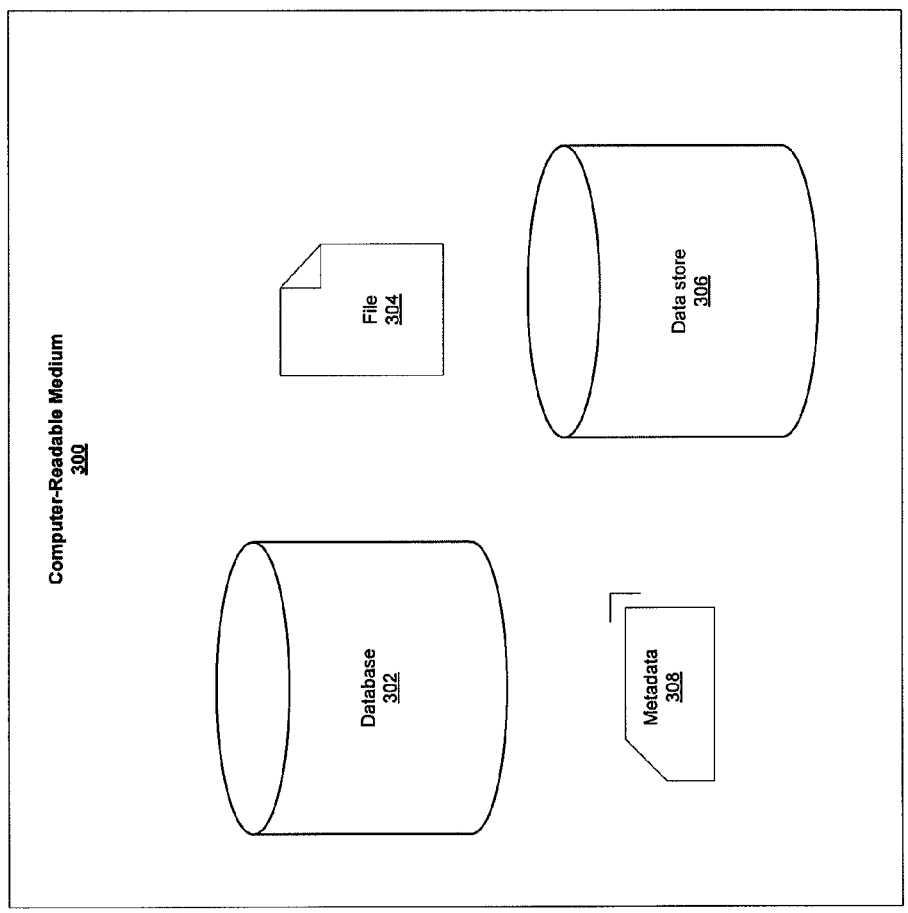
FIG. 3 shows an example of a computer-readable medium with computer-executable instructions and/or data stored thereon that may be used as a part of or in conjunction with computers, servers, assignment devices, and/or handheld devices in which various aspects of the disclosure may be implemented.

FIG. 3 shows an example of a computer-readable medium with computer-executable instructions and/or data stored thereon that may be used as a part of or in conjunction with computers, servers, printers, and/or handheld devices. As illustrated in FIG. 3, the information may be stored on computer-readable medium 300 or on a plurality of such media 300. The medium or media 300 may be network attached storage or integral with server(s) 160. The information may be stored together or separately in one or more databases 302, files 304, data stores 306, or as metadata 308.

Figure 4:
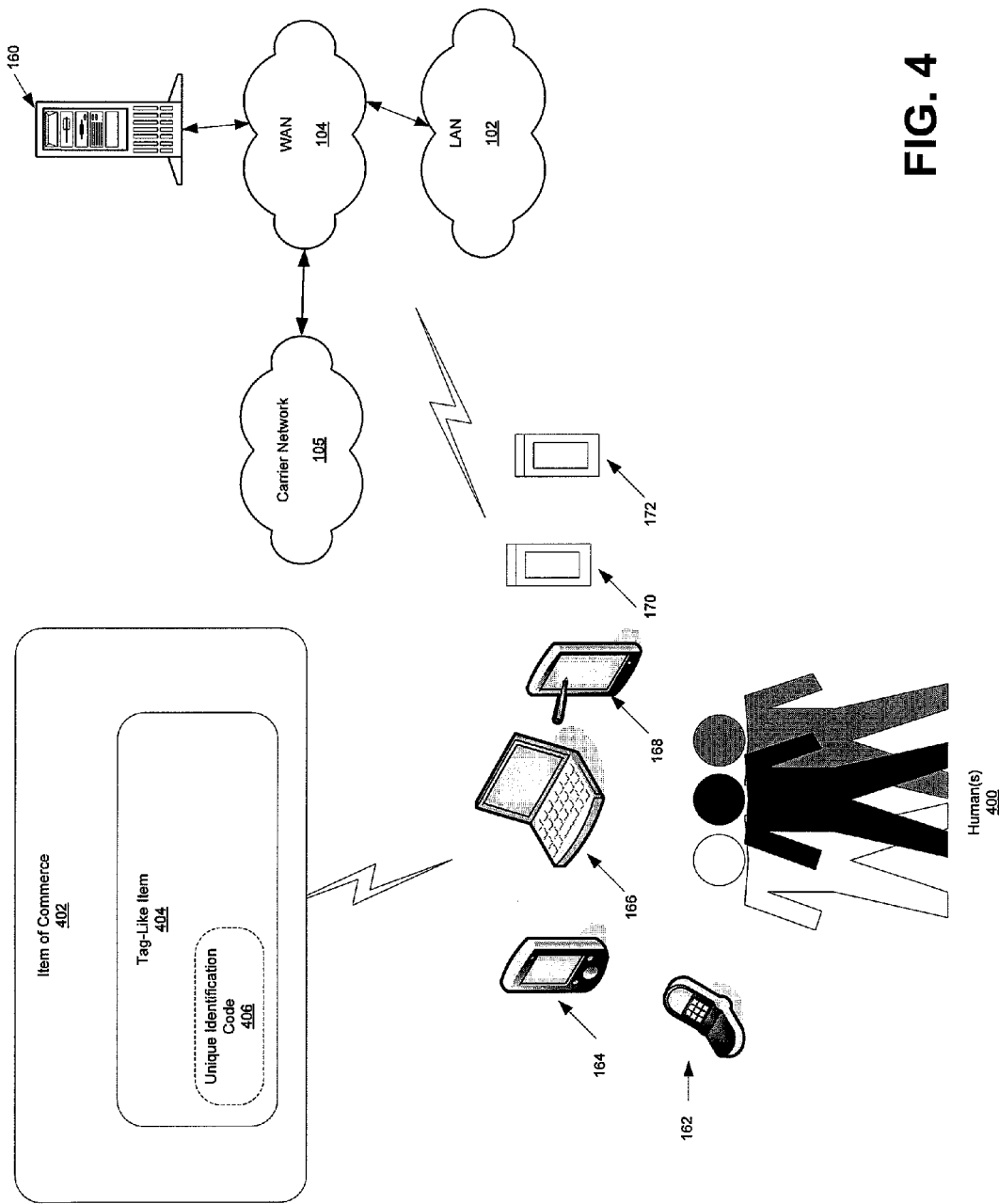
FIG. 4 depicts a sample LAN, WAN, and/or carrier network topology in which a handheld device may be utilized to read or enter a unique identification code as well as upload and/or download information pertaining to the corresponding item of commerce.

FIG. 4 depicts a sample LAN, WAN, and/or carrier network topology in which a handheld device may be utilized to read or enter a unique identification code 406 as well as upload and/or download information pertaining to an item of commerce 402. As shown in FIG. 4, customers, users, inspectors, representatives or other authorized personnel 400 may utilize a handheld device such as, for example, RFID readers or RFID reader/writers 170, bar code scanners 172, notebook computers 166, personal digital assistants 164, tablet pcs 168, cellular telephones (with or without cameras) 162 or other devices to capture automatically or to enter manually the unique identification code 406 from a tag-like item 404 for an item of commerce 402. This may be accomplished, for example, by reading from a tag-like item 404 with the unique identification code 406 printed or stored thereon by reading a radio frequency identification, reading a barcode, performing optical character recognition, allowing manual entry of the code through a keyboard, or by using any other reading or entry method.

The unique identification code 406 may then be transmitted wirelessly from the handheld device or through a personal computer to carrier network 105, LAN 102, and/or WAN 104 in order to be communicated as an inquiry to server 160. Optionally, the user may be allowed to register one or more times, or may not have to register at all. Ideally, the user 400 would register a single time.

Based on the unique identification code 406 received as an inquiry by the server 160, information may be provided to the user 400 in order to determine whether the item of commerce 402 is authentic, has been diverted, whether accessories, additional products, or replacement products are available and, if so, where they can be found. Advertising or other product information may be provided as well.

Similarly, authorized users 400 may also be able to upload to the server 160 information about the item of commerce 402. This is particularly helpful in the event that diverted or counterfeit product is located. Any such product could be flagged in by the server 160 in the computer-readable media 300 and could be used to track the source of the problem. It is also helpful to facilitate tracking of the item of commerce 402 in the supply chain as well as to memorialize any identified quality control issues. The uploaded information may be in the form of text, audio, and/or video. The uploaded information may be accessible by server 160 and may be stored on computer-readable medium 300 or linked thereto.

Responses from the server 160 to inquiries made by handheld devices may be provided directly the server and may be pre-determined based on the desires of a manufacturer, distributor, retailer, or other authorized entity. Alternatively, the responses may be dynamic based on the nature of the inquiry and the contents of the database(s) for the item of commerce. Another option is for a server 160 to route or relay an inquiry for an item of commerce 402 to the appropriate manufacturer, distributor, retailer, or other authorized entity in order for them to provide a response to the person 400 making the inquiry. The response may be provided directly from the manufacturer, distributor, retailer, or authorized entity to the person 400. Or, the response may be routed or relayed from the manufacturer, distributor, retailer, or authorized entity through the server 160 to the person 400.

Figure 5:
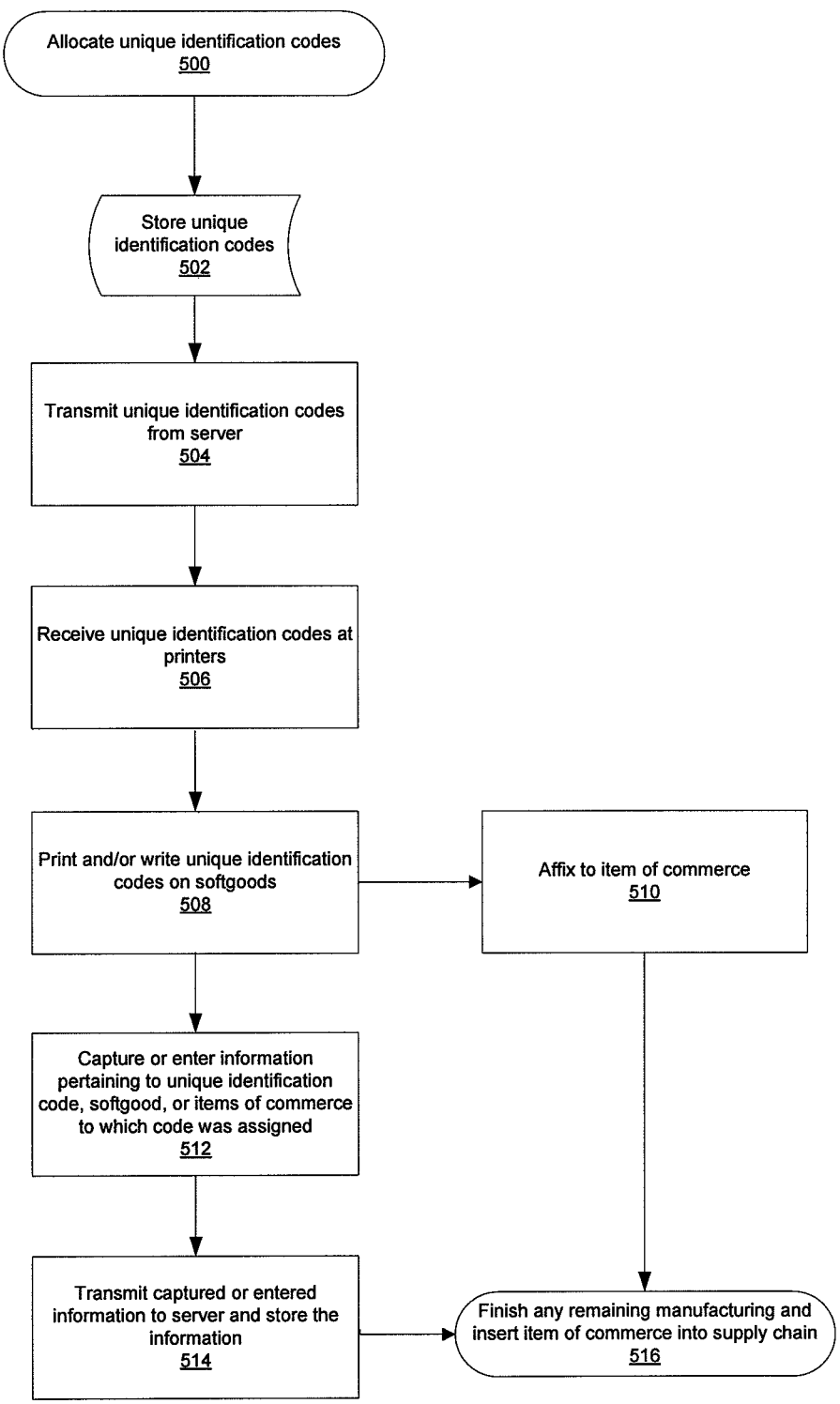
FIG. 5 is a flow diagram that demonstrates how unique identification codes may be assigned to items of commerce in accordance with the distributed topology of FIG. 2.

FIG. 5 is a flow diagram that demonstrates how unique identification codes may be assigned to items of commerce in accordance with the distributed topology of FIG. 2 or any other desired configuration. Unique identification codes may be allocated by one or more servers 500 in blocks of codes or individually. If desired, the allocations of unique identification codes may be stored 502 by the server(s) on a computer-readable medium.

The unique identification codes may be then transmitted 504 to printers 202-208, 212-218. This communication 504 may be made from one or more servers 160, through a WAN 104, through a LAN 200, 210, and to printers 202-208, 212-218. In such a configuration, the LAN 200 may include router(s), switch(es), computers, and/or servers in communication with and/or in control of printers 202-208. Alternatively, the communication 504 may be made directly from one or more servers 160 through a WAN 104 directly to printers 202-208, 212-218.

In some embodiments, printers 202-208 and 212-218 may be limited and only allowed to print or write a unique identification code a single time. This would eliminate any possibility of duplicate codes being printed or assigned to different items of commerce. In other embodiments, printers 202-208 and 212-218 may be controlled locally and/or a local override may be provided in order to print again a unique identification code if an error occurred during an initial print or write attempt.

Either way, printers 202-208, 212-218 receive the unique identification codes 506. Each code is then printed and/or written on a tag-like item 508 for a single item of commerce.

Information pertaining to the unique identification code, tag-like item, or item of commerce to which the code was assigned may be captured automatically, assigned automatically or dynamically by the assignment devices, or entered manually 512. Sample information includes, but is not limited to, authenticity information, checkpoint information, contract number, country of origin, creation date, customs information, consumer identification information, drawings, EPC number, geographical location, invoice number, item size, item type, location in supply chain, manufacturing date, manufacturing location, notes, photographs, purchase order number, quality control information, retailer information, SKU number, and videos. Some or all of the information may be transmitted to one or more servers 514.

The tag-like item may be affixed an item of commerce 510 in various manners, depending on whether the tag-like item is a tag, label, ticket, sticker, hang tag, price ticket, woven label, heat transfer label, woven neck label, care label, or security label. Similarly, in direct print applications, the unique identification code may be printed on an item of commerce 510 in various manners depending on whether the item of commerce is apparel, other softgood, a container, packaging, device etc.

Any remaining manufacturing or processing may be completed and the item of commerce may be inserted into the supply chain 516.

Figure 6:
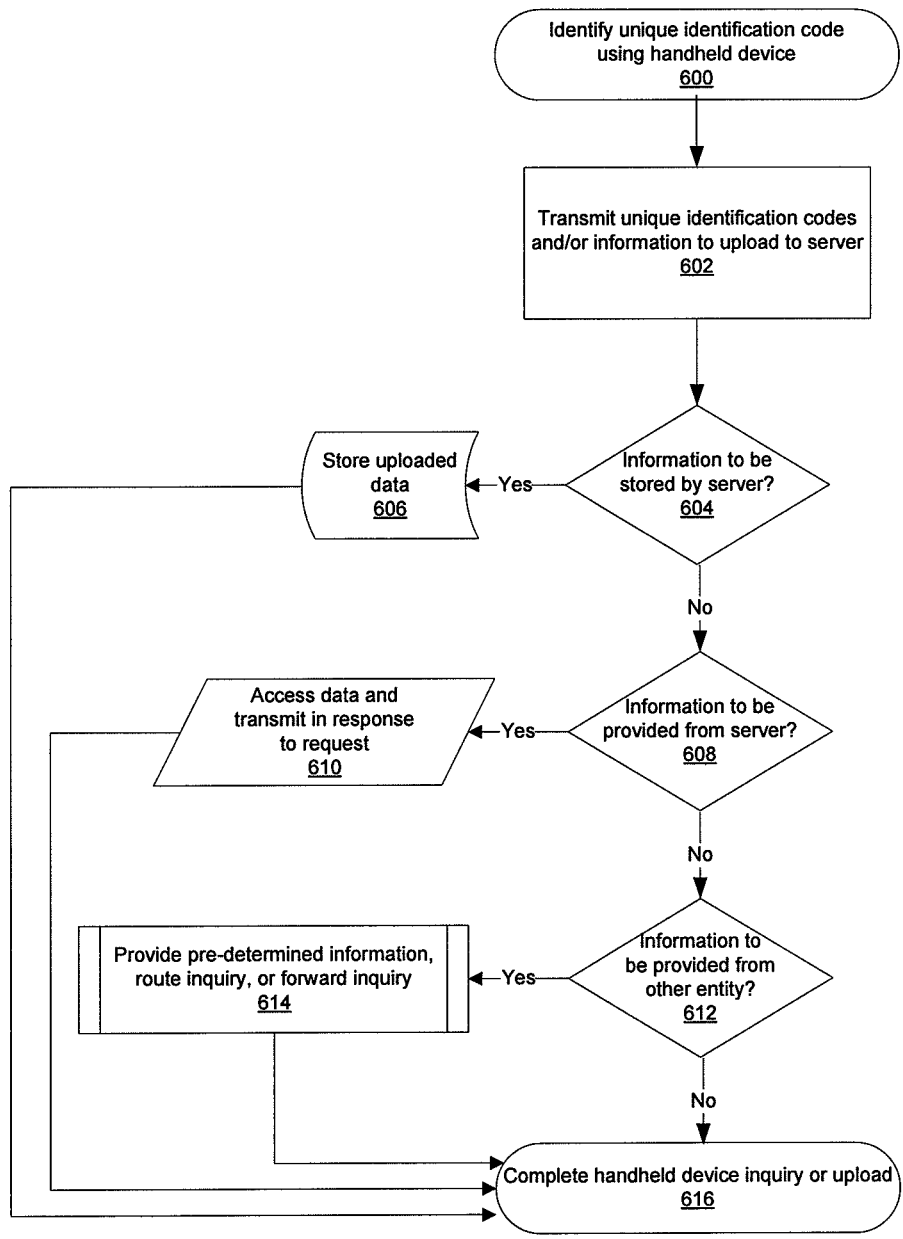
FIG. 6 is a flow diagram that illustrates how handheld devices may be used to read or enter unique identification codes as well as upload and/or download information pertaining to items of commerce such as, for example, as shown in the topology of FIG. 4.

FIG. 6 illustrates how handheld devices may be used to read or enter unique identification codes as well as upload and/or download information pertaining to items of commerce such as, for example, as shown in the topology of FIG. 4.

In particular, a handheld device may be used to identify automatically or to manually enter a unique identification code 600 for an item of commerce. In addition, information pertaining to the item of commerce may be captured or entered by the handheld device.

The code as well as any captured or entered information may then be transmitted to the server 602. If information is to be stored by the server 604, then the uploaded information may be stored on one or more computer-readable media 300 in database(s) 302, file(s) 304, as data store(s) 306, or as metadata 308.

If information was requested from the server and is therefore to be provided in response 608, the appropriate data may be accessed by the server and transmitted in response to the request 610.

If information is to be provided regarding another entity 612 such as, for example, by a manufacturer, distributor, or advertiser, the server may transmit pre-determined information provided by any of those entities in response to the request 614.

Alternatively, the server may relay or route any such request to the manufacturer, distributor, advertiser, or other designated entity in order to provide a response. The response may be provided directly from manufacturer, distributor, advertiser, or other designated entity to the handheld device. Or, the response may be routed from the manufacturer, distributor, advertiser, or other designated entity to the server, which may then forward the response on to the handheld device.

Persons of skill in the art will understand how various aspects of the present invention may be used to allocate and control the assignment of a single unique identification code to a single item of commerce. The code may be printed a plurality of times, if desired, however each tag-like item on which the code is printed is to be applied to the same item of commerce. This helps provide global tracking of the item of commerce in the supply chain from manufacturing, through distribution, through sales, and even post-sale.

For example, as the item of commerce is moved through a supply chain, the codes may be read and information regarding location may be uploaded to the server. If quality control, counterfeiting, diversion, or other problems arise, information may be uploaded to the server. Persons interested in accessing the information may do so by provide the unique identification code in question for the item of commerce to the server.

Although the foregoing examples explain how the present invention: could direct print unique identification codes on items of commerce, could apply unique identification codes to tag-like items for items of commerce, could store a variety of information about the codes and items of commerce on server(s), could allow downloading or uploading of content by users with handheld or other devices to information regarding the items of commerce, persons of skill in the art will understand that this concept could also be applied to any type of printing system or product tracking methodology for a supply chain, authentication of products, or connecting of customers with manufacturers, retailers, distributors, or advertisers prior to, at the time of, or after the sale of a product.

Although not required, one of ordinary skill in the art will appreciate that various aspects described herein may be embodied as a method, a data processing system, or as one or more computer-readable media storing computer-executable instructions. Accordingly, those aspects may take the form of an entirely hardware embodiment, an entirely software embodiment or an embodiment combining software and hardware aspects. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

We claim:

1. A method comprising:
    providing a plurality of unique identification codes to a plurality of manufacturers of an item of commerce, the plurality of unique identification codes are provided from at least one server, which assigns and keeps track of the plurality of unique identification codes;
    allowing a plurality of assignment devices of the plurality of manufacturers to print said plurality of unique identification codes onto a plurality of tag-like items, the plurality of assignment devices receiving the unique identification codes from the at least one server;
    wherein an item of commerce is inserted into the supply chain;
    wherein each said unique identification code corresponds to an item of commerce and includes at least one of information about the item, information about one of the plurality of manufacturers, and information about the retailer; and wherein the tag-like item is affixed to the item of commerce.

2. The method of claim 1 wherein the tag-like items are selected from the group consisting of: a tag, a label, a ticket, a sticker, a hang tag, a price ticket, a woven label, a heat transfer label, a woven neck label, a care label, and a security label.

3. The method of claim 1 wherein the plurality of unique identification codes are transmitted over a wide area network by said at least one server to the plurality of assignment devices.

4. The method of claim 3 wherein the wide area network is an Internet and the plurality of assignment devices are a plurality of printers.

5. The method of claim 1 wherein said plurality of printers is located at a plurality of locations remote to said at least one server.

6. The method of claim 1 further comprising the step of providing, to the server, information regarding one of said plurality of unique identification codes and the item of commerce on which said one of said plurality of unique identification codes was printed.

7. The method of claim 6 wherein the information is selected from the group consisting of: authenticity information, checkpoint information, contract number, country of origin, creation date, customs information, consumer identification information, drawings, EPC number, geographical location, invoice number, item size, item type, location in supply chain, manufacturing date, manufacturing location, notes, purchase order number, quality control information, retailer information, SKU number, and videos.

8. The method of claim 1 wherein the plurality of unique identification codes are human readable.

9. The method of claim 1 wherein the plurality of unique identification codes are machine readable.

10. The method of claim 1 wherein the plurality of unique identification codes are human readable and machine readable.

11. The method of claim 1 wherein the plurality of printers is selected from the group consisting of: radio frequency identification printers, bar code printers, laser printers, thermal printers, and inkjet printers.

12. The method of claim 1 wherein said plurality of unique identification codes are EPC numbers.

13. The method of claim 1 wherein the provided information is stored in at least one database.

14. The method of claim 1 further comprising the steps of:
receiving an inquiry regarding at least one of said tag-like items;
using the inquiry to reference in said at least one database at least a portion of the provided information for said one of the tag-like items; and
providing information in response to the inquiry.

15. The method of claim 14 wherein the inquiry is received through the Internet.

16. The method of claim 15 wherein the inquiry is received through the Internet from a cellular carrier network.

17. The method of claim 16 further comprising the step of allowing a handheld device to be utilized in order to generate and wirelessly make the inquiry.

18. The method of claim 17 further comprising the step of the handheld device reading at least one of said unique identification codes for one of at least one of said tag-like items.

19. The method of claim 18 wherein the inquiry includes said at least one of said unique identification codes.

20. The method of claim 17 wherein the handheld device reads at least one of said unique identification codes by radio frequency identification.

21. The method of claim 17 wherein the handheld device reads at least one of said unique identification codes by reading a barcode.

22. The method of claim 17 wherein the handheld device reads at least one of said unique identification codes by performing optical character recognition.

23. The method of claim 17 wherein the handheld device is selected from a group consisting of: a cellular telephone, a personal digital assistant, a barcode scanner, a radio frequency identification reader, a notebook computer, and a laptop computer.

24. The method of claim 14 further comprising determining whether one of said tag-like items is authentic based on said at least a portion of the provided information received in response to the inquiry.

25. The method of claim 14 further comprising the steps of:
allowing a customer to register;
storing information about the customer; and
using said information in order to identify the customer when said inquiry is made.

26. The method of claim 14 further comprising the steps of:
receiving an inquiry regarding at least one of said tag-like items;
using the inquiry to identify in said at least one database a party; and
providing a pre-determined response from said party in response to the inquiry.

27. The method of claim 26 further comprising the steps of:
allowing a customer to register;
storing information about the customer; and
using said information in order to identify the customer when said inquiry is made.

28. The method of claim 14 further comprising the steps of:
receiving an inquiry regarding at least one of said tag-like items;
using the inquiry to identify in said at least one database a party to whom said inquiry should be forwarded; and
forwarding the inquiry to the party.

29. The method of claim 28 further comprising the step of allowing the party to provide a direct response to the inquiry.

30. The method of claim 28 further comprising the step of relaying a response from the party regarding the inquiry.

31. The method of claim 28 wherein the party is selected from the group consisting of: a manufacturer, a reseller, a retailer, a distributor, a government entity, and an authorized entity.

32. The method of claim 28 further comprising the steps of:
allowing a customer to register;
storing information about the customer; and
using said information in order to identify the customer when said inquiry is made.

33. A non-volatile computer-readable medium having computer-executable instructions stored thereon, the computer-executable instructions configured to instruct one or more computer processors to perform the operations of:
allocating unique identification codes, each unique identification code corresponding to a single item of commerce and including at least one of information about the item, information about a manufacturer, and information about the retailer;
storing the unique identification codes in a database;
transmitting the unique identification codes to a plurality of manufacturers for use in a plurality of printers located in a plurality of geographical locations that print the unique identification codes on tag-like items;

receiving information regarding which said unique identification codes were printed on which said tag-like items and affixed to which items of commerce;

storing said information in the database;

receiving an inquiry regarding one of said unique identification codes;

accessing a portion of the database that corresponds to the one of said unique identification codes; and transmitting at least a portion of the information stored in the database that corresponds to the one of said unique identification codes in response to the inquiry.

34. A system comprising:

a server including:

a first processor for executing first computer-executable instructions;

a first memory that stores the first computer-executable instructions and a database;

server communication means to communicate information stored in the database;

wherein the first computer-executable instructions cause the processor to:

allocate unique identification codes, each unique identification code corresponding to a single item of commerce and including at least one of information about the item, information about the manufacturer, and information about the retailer;

store the unique identification codes in the database;

transmit the unique identification codes to a plurality of manufacturers for use on tag-like items to be affixed to items of commerce;

receive information regarding which said unique identification codes were used with which said tag-like items and affixed to which items of commerce;

store said information in the database;

receive an inquiry regarding one of said unique identification codes;

access a portion of the database that corresponds to the one of said unique identification codes; and transmit at least a portion of the information stored in the database that corresponds to the one of said unique identification codes in response to the inquiry;

a plurality of printers including:

printer communication means to receive said unique identification codes;

printer means to print said unique identification codes on said tag-like items, a printer vision system or other automation equipment configured to automatically detect information regarding which unique identification code is used with which item of commerce;

wherein said tag-like items are selected from the group consisting of: a tag, a label, a ticket, a sticker, a hang tag, a price ticket, a woven label, a heat transfer label, a woven neck label, a care label, and a security label; and a plurality of computers including:

second processors for executing second computer-executable instructions;

second memories that store the second computer-executable instructions;

second communication means to transmit tag-like items information to the server, said tag-like items information selected from the group consisting of: authenticity information, checkpoint information, contract number, country of origin, creation date, customs information, consumer identification information, drawings, EPC number, geographical location, invoice number, item size, item type, location in supply chain, manufacturing date, manufacturing location, notes, photographs, purchase order number, quality control information, retailer information, SKU number, and videos.

\* \* \* \* \*